United States Patent [19]
Bernard et al.

[11] Patent Number: 4,731,648
[45] Date of Patent: Mar. 15, 1988

[54] INTERSTITIAL SIGNAL GENERATING SYSTEM

[75] Inventors: Francis S. Bernard, Plainsboro; Chandrakant B. Patel, Hopewell, both of N.J.

[73] Assignee: RCA Corporation, Princeton, N.J.

[21] Appl. No.: 912,628

[22] Filed: Sep. 29, 1986

[51] Int. Cl.$^4$ .............................................. H04N 7/18
[52] U.S. Cl. ..................................... 358/105; 358/140
[58] Field of Search .......................... 358/105, 140, 11

[56] References Cited

U.S. PATENT DOCUMENTS

| | | | |
|---|---|---|---|
| 4,400,719 | 8/1983 | Powers | 358/21 R |
| 4,484,188 | 11/1984 | Ott | 358/11 X |
| 4,625,239 | 11/1986 | Vreeswijk | 358/105 X |
| 4,663,653 | 5/1987 | Patel | 358/11 |

FOREIGN PATENT DOCUMENTS 0169527  1/1986 European Pat. Off. .

*Primary Examiner*—Howard W. Britton
*Assistant Examiner*—Victor R. Kostak
*Attorney, Agent, or Firm*—Eugene M. Whitacre; Paul J. Rasmussen; Eric P. Herrmann

[57] ABSTRACT

A system for generating an interstitial signal for a double scanning non-interlaced (progressive scan) television display is disclosed. When no motion is detected in the neighborhood of the interstitial pixel, a pixel generated from pixels in the adjacent fields to that of said interstitial pixel is supplied at the interstitial pixel for further processing. When motion in a relatively downward direction is detected, then a pixel generated from pixels in lower adjacent lines to, and in the same field as, that of the interstitial pixel is supplied as the interstitial pixel. When motion in a relatively upward direction is detected, then a pixel generated from pixels in upper adjacent lines to, and in the same field as, that of the interstitial pixel is supplied as the interstitial pixel.

17 Claims, 7 Drawing Figures

INTERSTITIAL SIGNAL GENERATING SYSTEM

The present invention relates to a double scanning non-interlaced (progressive scan) television signal display apparatus including a system for generating signals representing pixels of interstitial lines of a component of the composite video input signal.

Current video signal transmission standards provide for two-to-one interlace scanning. There are visible artifacts, however, inherent in images displayed by such a scanning structure. First, a line flicker artifact is produced at horizontal edges of image objects, such as the tops and bottoms of lettering. Second, line scanning structure is visible due to alternating displays of a first vertical scan of every other horizontal line, followed by a second vertical scan of the lines lying between those of the first vertical scan.

U.S. Pat. No. 4,400,719 entitled "Television Display System With Reduced Line-Scan Artifacts" issued Aug. 23, 1983 to Powers, illustrates in FIG. 13 and describes in the corresponding text, an exemplary double scanning non-interlaced television display system. In this system, a signal representing an interstitial line to be displayed between two lines of the field currently being received, is generated. This signal is composed from two estimates of pixels in the interstitial line. The first has the average value of the values of pixels from the lines above and below the interstitial line in the same field. The second has the value of the corresponding pixel from the preceeding field. A motion detector, responsive to the video signal, detects the presence of motion in the neighborhood of the interstitial line pixels. If motion is detected, then the estimate generated from the pixels in the vertically adjacent lines in the same field as the interstitial line is supplied as the interstitial line pixel for further processing. In the absence of motion, the estimate generated from the corresponding pixel in the preceeding field is supplied for further processing.

European patent application No. 169,527 entitled "Signal Converting Method and Circuit for Television Receiver" filed by Hitachi, Ltd. and published Jan. 29, 1986, describes a double scanning non-interlaced video signal display system in which pixels in an interstitial line are estimated by a weighted average of pixels in the two vertically adjoining lines in the same field as the interstitial line. The weighting of the pixels from the upper and lower adjoining line is determined by the relative values of the corresponding pixel from the preceeding field and the pixels in the upper and lower adjoining lines.

Any line averaging technique used to generate an interstitial line signal reduces the vertical resolution of the reproduced image. In addition, the present inventors discovered that an interstitial color difference signal generating system which uses a line averaging technique adversely affects proper color rendition in the interstitial line generated in the presence of a color transition. For example, at the boundary of regions of different colors, a line averaging technique will estimate the luminance value as being at a gray level between the luminance values of the two different color regions thus reducing vertical resolution. A line averaged estimate of the chrominance value will result in an estimated color which will most probably not be either one of the colors of the two regions. For example, the average of a fully saturated blue line and a fully saturated green line is a line having approximately 60% saturation (relative to full saturation) and having a cyan hue.

In order to avoid such artifacts in accordance with principles of the present invention, when no motion is detected in the neighborhood of the interstitial pixel, a pixel generated from pixels in adjacent fields to that of the interstitial pixel is selected as the interstitial pixel for further processing. When motion in the neighborhood of the interstitial pixel is in a relatively upward direction, then a pixel generated from pixels in upper adjacent lines to, and in the same field as, that of the interstitial pixel is selected as the interstitial pixel. When motion in the neighborhood of the interstitial pixel is in a relatively downward direction, then a pixel generated from pixels in lower adjacent lines to, and in the same field as, that of the interstitial pixel is selected as the interstitial pixel.

Figure 1:
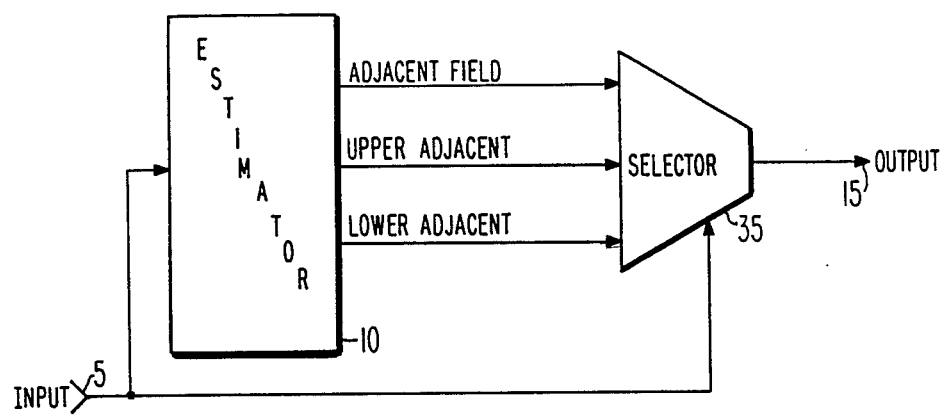
FIGS. 1 and 2 are block diagrams illustrating interstitial signal generators in accordance with principles of the present invention.

In FIG. 1, an input terminal 5 is coupled to a source (not shown) of a component of the composite video signal. The source may be an output of a luminance/chrominance separator in a standard television receiver. It may also be a color difference signal output of a chrominance demodulator. Input terminal 5 is coupled to a data input terminal of an interstitial pixel estimator 10 and a control input terminal of pixel selector 35. Estimator 10 produces at respective output terminals, three estimates of the interstitial pixel. The three output terminals are coupled to respective data input terminals of pixel selector 35. Pixel selector 35 provides a signal representing successive interstitial pixels at an interstitial component signal output terminal 15.

In operation, estimator 10 generates the first estimate from pixels in adjacent fields to that of the interstitial pixel; for example, the pixel in the same horizontal and vertical location as the interstitial pixel and from the next preceding field. The second estimate is generated from pixels in upper adjacent lines to, and in the same field as, the interstitial pixel; for example, the pixel in the same horizontal location but in the upper adjoining line to that of the interstitial pixel. The third estimate is generated from pixels in lower adjacent lines to, and in the same field as, the interstitial pixel; for example, the pixel in the same horizontal position but in the lower adjoining line to that of the interstitial pixel.

Pixel selector 35 calculates the magnitude and direction of image motion in the neighborhood of the interstitial pixel. The magnitude of image motion may be calculated by comparing respective pixels in the same horizontal and vertical location as that of the interstitial pixel but from preceeding and succeeding fields. The direction of image motion may be calculated by comparing the pixel at the same horizontal and vertical location as, and in the preceding field to, that of the interstitial pixel, respectively to the pixels in the same field as that of the interstitial pixel but located immediately above and below it. If the magnitude of motion is relatively small, then the estimate from adjacent fields is selected as the interstitial pixel. If the motion is in a relatively downward direction, the estimate from lower adjacent lines is selected as the interstitial pixel. If the motion is in a relatively upward direction, the estimate from upper adjacent lines is selected as the interstitial pixel.

Figure 2:
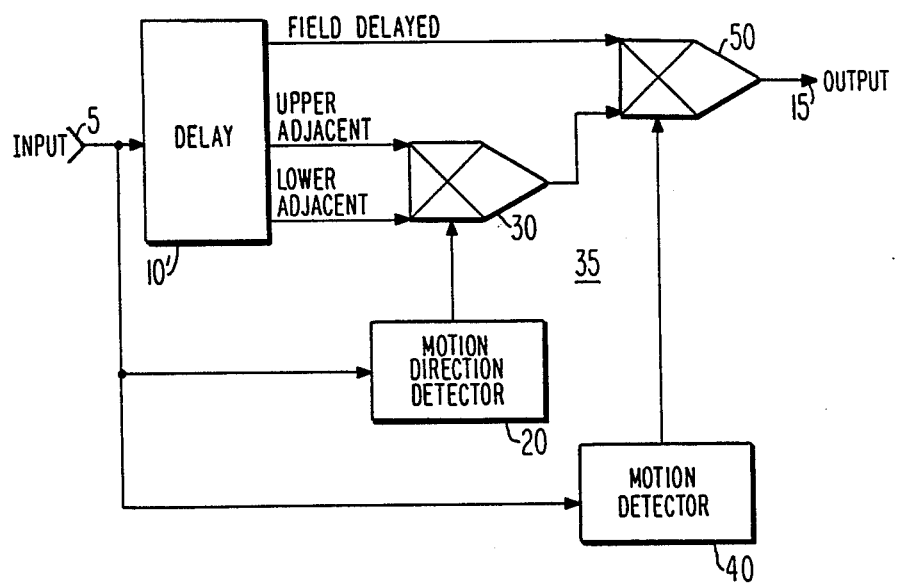

FIG. 2 illustrates a more detailed embodiment of an interstitial signal generator. Elements similar to those in FIG. 1 are designated by the same reference number and operate in the same manner. Input terminal 5 is coupled to respective input terminals of a delay device 10' (which operates as estimator), a motion direction detector 20 and a motion detector 40. Delay device 10' produces at respective output terminals, a field delayed component signal which is coupled to a first data input terminal of a multiplexer 50, and upper and lower adjacent line component signals which are coupled to respective data input terminals of a second multiplexer 30. A data output terminal of multiplexer 30 is coupled to a second data input terminal of multiplexer 50. The output terminal of multiplexer 50 is coupled to an interstitial component signal output terminal 15. An output terminal of motion direction detector 20 is coupled to a control input terminal of multiplexer 30. An output terminal of motion detector 40 is coupled to a control input terminal of multiplexer 50. Motion direction detector 20, motion detector 40 and multiplexers 30 and 50, in combination, perform the function of pixel selector 35 (of FIG. 1). Interstitial component signal output terminal 15 produces a signal representing the pixels in the interstitial line. This signal may be time compressed and time division multiplexed with signals from the current field to display a double scanned non-interlaced display.

Figure 3:
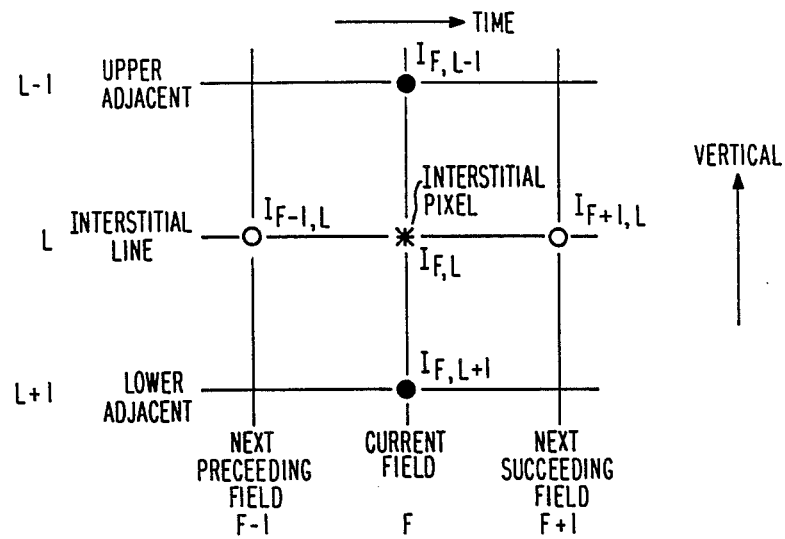
FIG. 3 is a vertical/temporal pictorial representation illustrating the lines of a double scanning non-interlaced display system and is useful in understanding the operation of apparatus illustrated in FIGS. 1 and 2.

The operation of the apparatus illustrated in FIG. 2 may be better understood by reference to the diagram illustrated in FIG. 3. By means of illustration, it will be assumed that the component signal supplied to the input terminal 5 (of FIG. 2) is the I color difference signal from a chrominance signal demodulator (not shown). FIG. 3 illustrates the relative positions of selected pixels representing a particular horizontal location of a displayed scene, as projected onto vertical and temporal (time) axes. All major television standards scan an image from top to bottom. Thus, the lines illustrated in FIG. 3 are scanned in the order: $L-1$, $L$, and $L+1$. The interstitial pixel being generated is marked with a star and is designated $I_{F,L}$. The small circles designated $I_{F-1,L}$ and $I_{F+1,L}$ are pixels on the same line as that of the interstitial pixel but from the next preceding and next succeeding field respectively. The filled in dots designated $I_{F,L-1}$ and $I_{F,L+1}$ represent pixels from the same field as that of the interstitial pixel but from the upper and lower adjoining lines respectively to the line of the interstitial pixel.

Referring again to FIG. 2, delay element 10' supplies respective signals representing three pixels surrounding the location of the interstitial pixel: $I_{F-1,L}$ (field delayed), $I_{F,L-1}$ (upper adjacent), and $I_{F,L+1}$ (lower adjacent). Motion detector 40 also receives the I color difference signal from input terminal 5. Motion detector 40 detects the presence of motion in the neighborhood of the interstitial pixel. Motion detector 40 may, for example, compare the values of the pixels $I_{F+1,L}$ and $I_{F-1,L}$ and if they differ by more than a given threshold, provide an indication that motion has been detected. When the signal supplied to the control input terminal of multiplexer 50 indicates that motion has been detected, multiplexer 50 is conditioned to supply the signal from multiplexer 30 to the interstitial component signal output terminal 15. Otherwise, multiplexer 50 is conditioned to supply the field delayed signal from delay element 10' to the interstitial component signal output terminal 15.

Multiplexer 30 supplies one of the signals representing the upper adjacent and lower adjacent pixels to the input of multiplexer 50, depending upon the relative direction of the motion in the neighborhood of the interstitial pixel, as detected by motion direction detector 20. Motion direction detector 20 may, for example, compare the value of pixel $I_{F-1,L}$ respectively to the values of pixels $I_{F,L-1}$ and $I_{F,L+1}$. If pixel $I_{F,L-1}$ is the closer in value to pixel $I_{F-1,L}$, this indicates that the image element which previously was on line $L$, is now on line $L-1$. The motion is, thus, assumed to be in an upward direction, and multiplexer 30 is conditioned to supply the signal representing upper adjacent pixel $I_{F,L-1}$ to the input of multiplexer 50. If pixel $I_{F,L+1}$ is the closer in value to pixel $I_{F-1,L}$, this indicates tht the image element which previously was line $L$, is now on line $L+1$. The motion is, thus, assumed to be in a downward direction, and multiplexer 30 is conditioned to supply the signal representing lower adjacent pixel $I_{F,L+1}$ to the input of multiplexer 50.

The interstitial component generated by the apparatus of FIG. 2 is never generated by an averaging process. Thus, it can never unduly degrade vertical resolution, or represent a color which does not appear in the scene. In addition, the vertical resolution is not unduly degraded as would be the case if the upper adjacent pixel were unconditionally supplied as the interstitial pixel.

Figure 4:
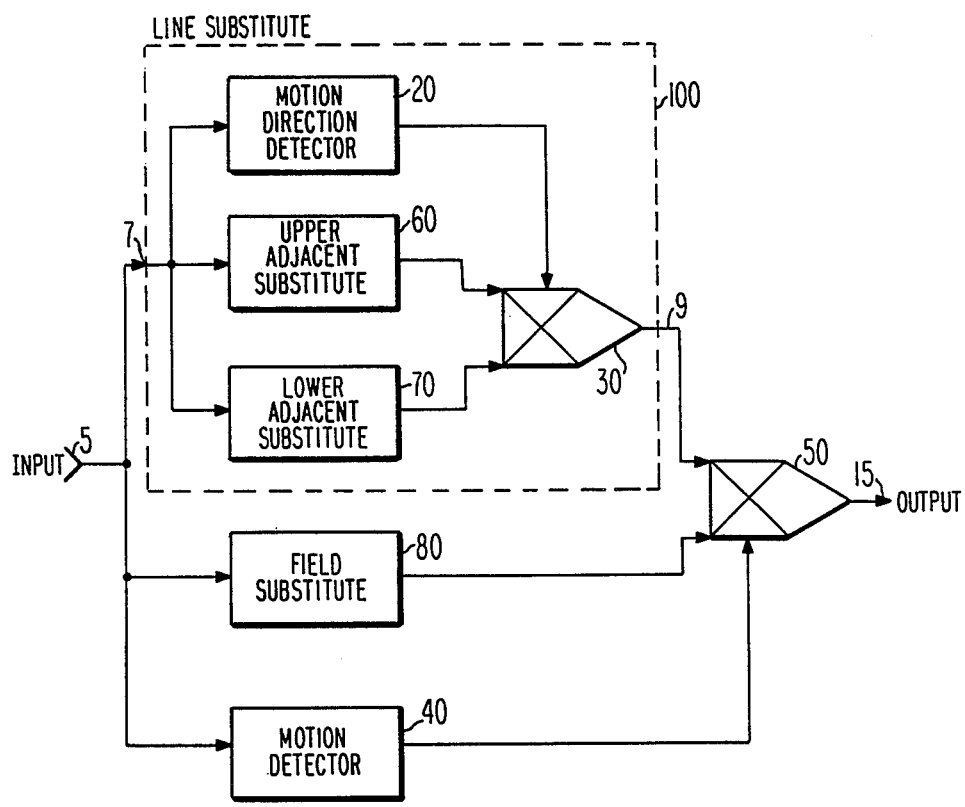
FIGS. 4 and 5 are block diagrams illustrating alternate embodiments of interstitial signal generators in accordance with principles of the present invention.

FIG. 4 illustrates an alternate embodiment of an interstitial color difference signal pixel generator. In FIG. 4, elements similar to those of FIG. 2 are designated by the same reference number, operate in the same manner and are not described in detail below.

In FIG. 4, component signal input terminal 5 is coupled to the respective input terminals of a line substitution element 100, a field substitution element 80 and a motion detector 40. The respective output terminals of the line substitution element 100 and the field substitution element 80 are coupled to data input terminals of a multiplexer 50. The output terminal of motion detector 40 is coupled to a control input terminal of multiplexer 50. The data output terminal of multiplexer 50 is coupled to an interstitial signal output terminal 15.

Input terminal 7 of line substitution element 100 is coupled to the respective input terminals of an upper adjacent line substitution element 60, a lower adjacent line substitution element 70 and a motion direction detector 20. The output terminals of upper adjacent line substitution element 60 and lower adjacent line substitution element 70 are coupled to respective data input terminals of a multiplexer 30. The output terminal of motion direction detector 20 is coupled to a control input terminal of multiplexer 30. The data output terminal of multiplexer 30 is coupled to an output terminal 9 of line substitution element 100.

In operation, line substitution element 100 produces a signal representing either the upper adjacent or lower adjacent pixel depending upon the direction of detected motion. Field substitution element 80 produces a signal representing the pixel on the same line as the interstitial pixel but from the preceding field. Motion detector 40 produces a signal indicating the presence or absence of motion in the neighborhood of the interstitial pixel. In the presence of motion, multiplexer 50 is conditioned to supply the signal from the line substitution element 100 to the interstitial component signal output terminal 15. In the absence of motion, multiplexer 50 is conditioned to couple the output signal from field substitution element 80 to the interstitial component signal output terminal 15.

Field substitution element 80 provides a signal representing the pixel $I_{F-1,L}$ (of FIG. 3). Upper adjacent line substitution element 60 provides a signal representing the pixel $I_{F,L-1}$ and lower adjacent line substitution element 70 provides a signal representing the pixel $I_{F,L+1}$. Motion direction detector 20 and multiplexer 30 cooperate in the same manner as in the apparatus illustrated in FIG. 2 to produce an estimate of the interstitial pixel $I_{F,L}$ based on pixels from the same field as that of the interstitial pixel at output terminal 9 of line substitution element 100.

Figure 5:
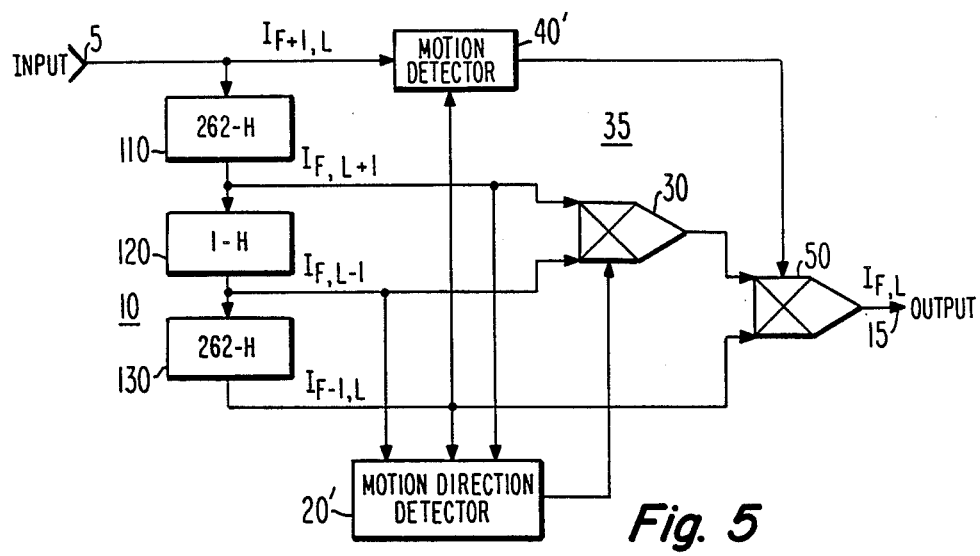

FIG. 5 illustrates another embodiment of apparatus according the present invention. Elements similar to those in apparatus illustrated in FIGS. 2 and 4 are designated by the same reference numbers and operate in a similar manner.

In FIG. 5, component signal input terminal 5 is coupled to the input terminal of a pixel estimator 10 formed by a cascade connection of delay elements 110, 120, and 130; and to a first input terminal of a motion detector 40'. Delay element 110 produces at an output terminal a signal which is delayed by 262 horizontal line intervals with respect to the signal at its input terminal. Delay element 120 produces a signal at its output terminal which is delayed by one horizontal line interval with respect to the signal at its input terminal. Delay element 130 produces a signal at its output terminal which is delayed by 262 horizontal line intervals with respect to the signal at its input terminal.

The output terminal of delay element 110 is coupled to a first data input terminal of multiplexer 30 and to a first input terminal of motion direction detector 20'. The output terminal of delay element 120 is coupled to a second data input terminal of multiplexer 30 and to a second input terminal of motion direction detector 20'. The output terminal of delay element 130 is coupled to a third input terminal of motion direction detector 20', a second input terminal of motion detector 40', and to a first data input terminal of a multiplexer 50. The output terminal of multiplexer 30 is coupled to a second data input terminal of multiplexer 50. The output terminal of motion direction detector 20' is coupled to a control input terminal of multiplexer 30. The output terminal of motion detector 40' is coupled to a control input terminal of multiplexer 50. Motion direction detector 20', motion detector 40' and multiplexers 30 and 50, in combination, perform the function of pixel selector 35 (of FIG. 1). The output terminal of multiplexer 50 is coupled to an interstitial component signal output terminal 15.

The operation of FIG. 5 will be described with respect to an I color difference signal. Referring to FIG. 3, the signal at input terminal 5 may be considered to represent the pixel $I_{F+1,L}$. The respective output signals of delay elements 110, 120, and 130 represent the pixels $I_{F,L+1}$, $I_{F,L-1}$ and $I_{F-1,L}$ respectively. Motion detector 40' and multiplexer 50 cooperate to couple the output signal from multiplexer 30 to the output terminal 15 in the presence of motion, and the output of delay element 130 to the interstitial component signal output terminal 15 in the absence of motion. Motion direction detector 20' and multiplexer 30 cooperate to couple the signal representing either the upper or lower adjacent pixel (whichever is closer in value to the field delayed pixel) to multiplexer 50.

Figure 6:
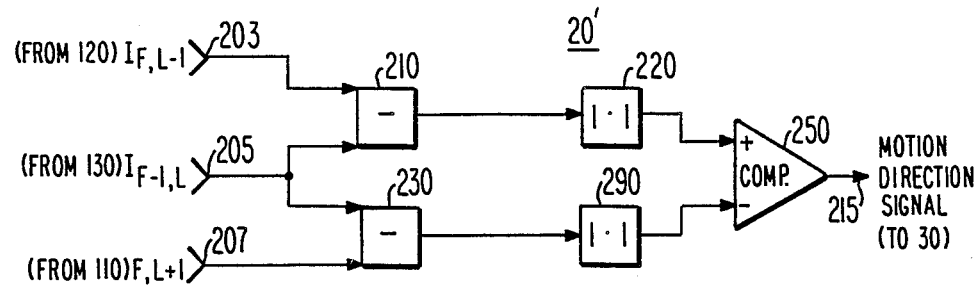
FIG. 6 is a block diagram of a motion direction detector which may be used in the apparatus illustrated in FIG. 5.

FIG. 6 illustrates an embodiment of a motion direction detector 20' which may be used in the apparatus illustrated in FIG. 5. In FIG. 6, input terminal 203 is coupled to the output terminal of delay element 120 and receives a signal representing the pixel $I_{F,L-1}$ (illustrated in FIG. 3). Input terminal 205 is coupled to the output terminal of delay element 130 and receives a signal representing pixel $I_{F-1,L}$, and input terminal 207 is coupled to the output terminal of delay element 110 and receives a signal representing pixel $I_{F,L+1}$.

Input terminal 203 is coupled to a first input terminal of a subtractor 210. Input terminal 205 is coupled to a second input terminal of subtractor 210 and a first input terminal of subtractor 230. The output terminal of subtractor 210 is coupled to an input terminal of absolute value circuit 220. The output terminal of absolute value circuit 220 is coupled to a first input terminal of a comparator 250. Input terminal 207 is coupled to a second input terminal of subtractor 230. The output terminal of subtractor 230 is coupled to an input terminal of a absolute value circuit 240. The output terminal of absolute value circuit 240 is coupled to a second input terminal of comparator 250. The output of comparator 250 is coupled to a motion direction signal output terminal 215. Motion direction signal output terminal 215 is coupled to the control input terminal of multiplexer 30 in FIG. 5.

In operation, subtractor 210 and absolute value circuit 220 produce a signal which represents the magnitude of the difference between the values of pixels $I_{F-1,L}$ and $I_{F,L-1}$. Subtractor circuit 230 and absolute value circuit 240 produce a signal which represents the magnitude of the difference between the values of pixels $I_{F-1,L}$ and $I_{F,L+1}$.

Comparator circuit 250 produces a signal at output terminal 215 which has a first state if the output signal from absolute value circuit 220 is greater than that from the absolute value circuit 240 and has a second state otherwise. If comparator circuit 250 produces an output signal having the first state, this means that the value of pixel $I_{F,L+1}$ is closer to the value of pixel $I_{F-1,L}$ than that of pixel $I_{F,L-1}$ and the direction of motion is relatively downward. When the first state output signal from comparator 250 is supplied to the control input terminal of multiplexer 30, multiplexer 30 is conditioned to couple the output signal from delay element 110 to the input terminal of multiplexer 50. If comparator circuit 250 produces an output signal having the second state, this means that the value of pixel $I_{F,L-1}$ is closer to the value of pixel $I_{F-1,L}$ than that of pixel $I_{F,L+1}$ and the direction of motion is relatively upward. When a second state signal is supplied to the control input terminal of multiplexer 30, multiplexer 30 is conditioned to couple the output signal from delay element 120 to the input terminal of multiplexer 50.

Figure 7:
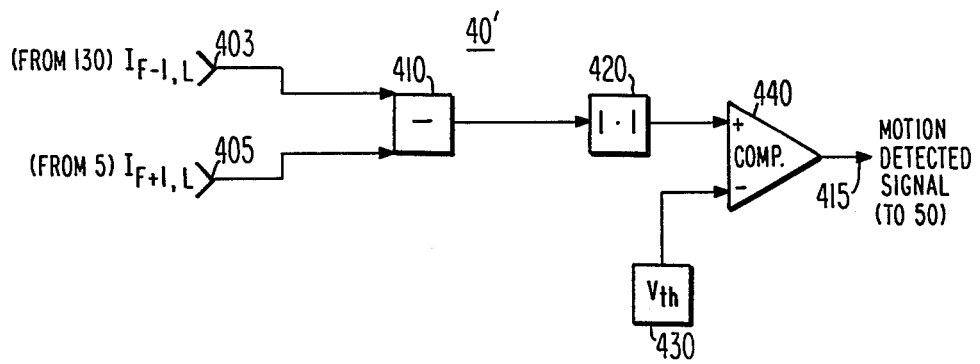
FIG. 7 is a block diagram of a motion detector which may be used in the apparatus illustrated in FIG. 5.

FIG. 7 illustrates a motion detector 40' which may be used in the apparatus illustrated in FIG. 5. In FIG. 7, input terminal 403 is coupled to the output terminal of delay element 130 and represents the pixel $I_{F-1,L}$. Input terminal 405 is coupled to input terminal 5 of FIG. 5 and represents the pixel $I_{F+1,L}$. Input terminals 403 and 405 are coupled to respective input terminals of a subtractor 410. The output terminal of subtractor 410 is coupled to an input terminal of an absolute value circuit 420. The output terminal of absolute value circuit 420 is coupled to a first input of a comparator 440. The output terminal of comparator 440 is coupled to a motion detected signal output terminal 415. An output terminal of a threshold value producing circuit 430 is coupled to a second input terminal of comparator 440. Output terminal 415 is coupled to the control input terminal of multiplexer 50 (of FIG. 5).

In operation, subtractor 410 and absolute value circuit 420 produce a signal representing the magnitude of the difference between the values of pixels $I_{F-1,L}$ and $I_{F+1,L}$. This signal represents the amount of change in the scene in the same line L as that of the interstitial pixel being generated but over the course of one frame period, that is from the preceding field (F−1) to the succeeding field (F+1) of that of the interstitial pixel. Comparator 440 produces a signal having a first state if the signal from absolute value circuit 420 exceeds the value from the threshold value producing circuit 430 and a second state otherwise. When comparator 440 produces a signal having the first state, this indicates that motion has been detected in the neighborhood of the interstitial pixel being generated. When the signal having a first state is coupled to the control input terminal of multiplexer 50 (of FIG. 5) multiplexer 50 is conditioned to couple the signal from the output terminal of multiplexer 30 to the output terminal 15. When a signal having a second state is coupled to the control input terminal of multiplexer 50, multiplexer 50 is conditioned to couple the output of delay element 130 to the output terminal 15.

What is claimed is:

1. An interstitial signal generating system, comprising:

an input terminal for receiving a signal representing successive pixels of at least one component of a composite video signal;

an output terminal for producing a signal including an interstitial pixel;

means coupled to said input terminal for producing signals representing first, second and third estimates of said interstitial pixel generated respectively from: pixels in adjacent fields to that of said interstitial pixel; pixels in upper adjacent lines to, and in the same field as, that of said interstitial pixel; and pixels in lower adjacent lines to, and in the same field as, that of said interstitial pixel; and means coupled to said input terminal and said estimate producing means for detecting magnitude and direction of image motion in the neighborhood of said interstitial pixel and for selectively providing said first estimate to said output terminal in the absence of image motion, said second estimate to said output terminal if image motion direction is relatively upward, and said third estimate to said output terminal if image motion is relatively downward.

2. The system of claim 1, wherein said selective providing means comprises:

means coupled to said input terminal for detecting the presence of motion in the neighborhood of said interstitial pixel;

means coupled to said input terminal for detecting the relative direction of motion in the neighborhood of said interstitial pixel;

first means coupled to said signal producing means and said motion direction detector and having an output port, for selectively coupling said signal representing said second estimate to said output port when said motion direction is relatively upward, and said third estimate to said output port when said motion direction is relatively downward; and second means coupled to said signal producing means, said first selective coupling means and said motion detector, for selectively coupling the signal from said output port to said output terminal in the presence of detected motion, and said signal representing said first estimate to said output terminal in the absence of detected motion.

3. The system of claim 1, wherein said signal producing means comprises a serial connection of a first and second delay elements having respective delays of one and 262 horizontal line intervals.

4. The system of claim 2, wherein said motion detecting means comprises:

a delay element having a delay of 525 horizontal line intervals; and means coupled to said delay element for producing a bistate signal having a first state when the values of the signals at the input and output of said delay element differ in magnitude by more than a predetermined amount, and a second state otherwise.

5. The system of claim 2, wherein said motion direction detecting means comprises:

the serial connection of a first and second delay elements having respective delays of one and 262 horizontal line intervals; and means coupled to said delay elements for producing a bistate signal having a first state when the value of the signal at the input of said serial connection is closer to the value of the signal at the output of said serial connection than that of the signal at the junction of said first and second delay elements, and a second state otherwise.

6. The system of claim 5, wherein said bistate signal producing means comprises:

first means for calculating the magnitude of the difference in value between signals at the input and output of said serial connection;

second means for calculating the magnitude of the difference in value between signals at the junction of said first and second delay elements, and at the output of said serial connection; and a comparator having respective inputs coupled to said first and second calculating means for producing said bistate signal.

7. The system of claim 2, wherein said signal producing means comprises a serial connection of first, second and third delay elements having respective delays of 262, one and 262 horizontal line intervals.

8. The system of claim 7, wherein said motion detecting means comprises means coupled to the input and output of said serial connection for producing a bistate signal having a first state when the values of the signals at said input and output differ in magnitude by more than a predetermined amount, and a second state otherwise.

9. The system of claim 7, wherein said motion direction detecting means comprises means coupled to the junctions of said first and second, and said second and third delay elements and to the output of said serial connection for producing a bistate signal having a first state when the value of the signal at the junction of said first and second delay elements is closer in value to that of the signal at the output of said serial connection than that of the signal at the junction of said second and third delay elements, and a second state otherwise.

10. The system of claim 9, wherein said bistate signal producing means comprises:
   first means for calculating the magnitude of the difference in value between signals at the junction of said first and second delay elements and at the output of said serial connection;
   second means for calculating the magnitude of the difference in value between signals at the junction of said second and third delay elements and at the output of said serial connection; and
   a comparator having respective inputs coupled to said first and second calculating means for producing said bistate signal.

11. An interstitial signal generating system comprising:
   an input terminal for receiving a signal representing successive pixels of at least one component of a composite video signal;
   an output terminal for producing a signal including an interstitial pixel in an interstitial line;
   first means coupled to said input terminal and responsive to pixels from fields adjacent that of said interstitial pixel for producing a signal representing a first estimate of said interstitial pixel;
   second means coupled to said source and responsive to pixels within the same field as that of said interstitial pixel for producing a signal representing a second estimate of said interstitial pixel, and including:
      means for producing a signal representing an estimated pixel from upper adjacent lines to that of said interstitial line,
      means for producing a signal representing an estimated pixel from lower adjacent lines to that of said interstitial line,
      means for detecting the relative direction of motion in the neighborhood of said interstitial pixel, and
      means for selectively producing said signal representing said estimated pixel from upper adjacent lines as said second estimate when the direction of motion is relatively upward, and said signal representing said estimated pixel from lower adjacent lines as said second estimate when the direction of motion is relatively downward;
   means coupled to said source for detecting motion in the neighborhood of said interstitial pixel; and
   means for selectively coupling said second estimate to said output terminal when motion is detected, and said first estimate to said output terminal otherwise.

12. The system of claim 11, wherein said first estimate producing means produces a signal representing a pixel spatially corresponding to said interstitial pixel but from the field preceding that of the interstitial pixel.

13. The system of claim 12 wherein said upper adjacent signal producing means comprises means coupled to said source which produces a signal advanced by substantially one field interval with respect to said first estimate.

14. The system of claim 12, wherein said lower adjacent signal producing means comprises means coupled to said source which produces a signal advanced by substantially one field interval plus one horizontal line interval with respect to said first estimate.

15. The system of claim 11, wherein said motion detecting means comprises:
   a delay element coupled to said source having a delay of 525 horizontal line intervals; and
   means coupled to said delay element for producing a bistate signal having a first state when the values of the signals at the input and output of said delay element differ by more than a predetermined amount, and a second state otherwise.

16. The system of claim 11, wherein said motion direction detecting means comprises:
   the serial connection of first and second delay elements having respective delays of one and 262 horizontal line intervals; and
   means coupled to said delay elements for producing a bistate signal having a first state when the value of the signal at the input of said serial connection is closer to the value of the signal at the output of said serial connection than that of the signal at the junction of said first and second delay elements, and a second state otherwise.

17. The system of claim 16, wherein said bistate signal producing means comprises:
   first means for calculating the magnitude of the difference in value between signals at the input and output of said serial connection;
   second means for calculating the magnitude of the difference in value between signals at the junction of said first and second delay elements, and at the output of said serial connection; and
   a comparator having respective inputs coupled to said first and second calculating means for producing said bistate signal.

* * * * *